(12) United States Patent
Fujimoto (10) Patent No.: US 6,546,041 B1
(45) Date of Patent: Apr. 8, 2003

(54) RADIO TRANSMISSION METHOD AND APPARATUS FOR DIGITAL INFORMATION

(75) Inventor: Atsushi Fujimoto, Chofu (JP)

(73) Assignee: Iwatsu Electric Co., Ltd., Tokyo (JP)

( * ) Notice: Subject to any disclaimer, the term of this patent is extended or adjusted under 35 U.S.C. 154(b) by 0 days.

(21) Appl. No.: 09/552,018

(22) Filed: Apr. 19, 2000

(30) Foreign Application Priority Data

Apr. 22, 1999 (JP) .......................................... 11-114969

(51) Int. Cl.[7] .................................................. H04B 1/69
(52) U.S. Cl. ...................................... 375/140; 375/130
(58) Field of Search ................................ 375/140, 130, 375/146, 147, 145, 150, 152, 316, 295; 455/118, 115, 131, 139, 182.1, 183.1

(56) References Cited

U.S. PATENT DOCUMENTS 6,122,295 A * 9/2000 Kato et al. ................... 370/479
6,134,264 A * 10/2000 Shiba et al. .................. 375/150
6,259,747 B1 * 7/2001 Gustafsson et al. ......... 332/103

* cited by examiner

Primary Examiner—Chi Pham
Assistant Examiner—Khai Tran
(74) Attorney, Agent, or Firm—Lackenbach Siegel, LLP (57) ABSTRACT

A baseband digital IQ signal modulated by digital information and a spread spectrum IQ code sequence whose auto-correlation side lobe is equal to zero are frame-synthesized with each other to obtain a transmission baseband IQ signal. A modulated radio-frequency wave obtained by modulating a radio-frequency wave is transmitted over a radio transmission line. From a received baseband signal obtained by receiving the modulated radio-frequency wave is separated a received signal of the spread spectrum IQ code sequence and a received signal of the baseband digital-modulated IQ signal. A waveform equalized signal which is obtained by waveform-equalization of the received signal of the baseband digital modulated IQ signal is demodulated by the use of transmission parameters of the radio transmission line derived from a despread spectrum signal obtained by dispreading the spread spectrum IQ code sequence, to obtain a received data signal of the digital information transmitted from the transmitting side.

3 Claims, 10 Drawing Sheets

(a) WITHOUT WAVEFORM EQUALIZATION (b) WITH WAVEFORM EQUALIZATION

RADIO TRANSMISSION METHOD AND APPARATUS FOR DIGITAL INFORMATION

BACKGROUND OF THE INVENTION

The present invention relates to a method and apparatus for radio transmission of digital information.

PRIOR ART

Methods and apparatus of this kind have already been implemented as radio LANs that utilize 2.4-MHz-band spread spectrum communication waves, but their transmission rates are of mostly 2 Mbps at most. Based not only on the recently growing CPU performance of terminal equipment but also on expectations for expanding practical applications containing pictorial images, graphics and similar image information, there is a strong demand for higher transmission rate.

To keep up with this current trend, IEEE 802.11 is now proceeding toward standardization of a new transmission system which achieves a maximum transmission rate as high as a bit rate of 11 Mbps, in addition to the existing standard system of the 2-Mpbs maximum transmission rate which uses the 2.4-MHz-band spread spectrum communication wave. The new transmission system is called a CCK system and is scheduled for practical utilization also in Japan in the near future.

Even if such a CCK system is put to practical use, however, the effective throughput is 5 to 6 Mbps at maximum and it is impossible to implement by radio LAN the same environment as the Ethernet of a 10-Mbps throughput.

Furthermore, a high-quality real-time image transmission system requires a throughput of above 6 Mbps, but the CCK system can barely satisfy this requirement and its transmission rate is far from sufficient.

The hidden factors that have hindered so far the implementation of satisfactory transmission rate despite the demand for higher transmission rate of the radio LAN are restrictions imposed on the radio frequency bandwidth by the rules of the Radio Law of Japan and a low frequency utilization factor of the spread spectrum system itself.

In Japan the radio frequency bandwidth allotted by the Radio Law to the spread spectrum communication system is 26 MHz in the 2.4 GHz band. On this account, the upper limit of the chip rate in a DS (Direct Sequence) system is 26 Mcps. The chip rate of 26 Mcps is, however, a theoretical upper limit value in the case of band limitation by an ideal Nyquist filter, and the upper limit of the actual chip rate is far lower.

That is, if a signal of a chip rate above 20 Mcps is band-limited by a Nyquist filter, the sampling frequency of a digital-to-analog converter becomes 40 MHz and a sharp band limitation of the converted signal is required; hence, in practice, no band limitation is involved, but instead band limitation of the base band is carried out by an analog filter after the digital-to-analog conversion. The upper limit of the chip rate in this instance is in the range of about 11 to 12 Mcps. The chip rate in IEEE 802.11 standard is of 11 Mcps and meets with this requirement.

When the chip rate is of 11 Mcps, the radio transmission rate without spread spectrum is 22 Mbps in case of QPSK (Quadrature Phase-Shift Keying) modulation. That is, when no spread spectrum takes place, the radio transmission rate is twice the chip rate.

On the other hand, the radio transmission rate for spread spectrum is of 22 Mbps in case of QPSK modulation according to the existing IEEE 802.11 standard and 11 Mbps according to a new standard planned to be work out in the near future. The transmission rates of these standard systems are of (1/5.5) and (1/2) timers higher than the chip rate, respectively.

The transmission of the IEEE 802.11 standard trades off the radio transmission rate for improvement of the multipath resistance and the narrow-band disturbance resistance, and hence cannot achieve a sufficient transmission rate.

To implement the same environment as the Ethernet of the 10 Mbps transmission rate by the radio LAN, it is necessary, in general, to increase the radio transmission rate up to approximately 15 Mbps or more. Moreover, it is usually recommended that a radio transmission rate above 20 Mbps is needed to use an application that requires a large transmission capacity such as a real-time image transmission under the radio LAN environment.

Nevertheless, the radio transmission rate of the radio LAN now commercially available is on the order of 2 Mbps at the highest. Even if a radio LAN is commercially introduced in compliance with the afore-mentioned new IEEE standard intended for a maximum of 11 Mbps transmission rate, the above-mentioned requirement cannot be met.

SUMMARY OF THE INVENTION

An object of the present invention is to provide a radio transmission method and apparatus for digital information which offer a radio transmission rate twice or more higher than the chip rate and permit high-speed, high-quality transmission at a transmission rate of above 20 Mbps at a 26-MHz band in the 2.4-GHz band.

To attain the above objective, there is proposed a radio transmission method for digital information according to the present invention comprising:

from a transmitting side, transmitting, over a radio transmission line, a modulated radio-frequency wave obtained by modulating a radio-frequency wave by a transmission baseband IQ signal, which is obtained by frame-synthesizing a baseband digital IQ signal modulated by the digital information to a spread spectrum IQ code sequence whose auto-correlation side lobe is equal to zero; and on the receiving side, separating a received signal of the spread spectrum code sequence and a received signal of the baseband digital-modulated IQ signal from a received baseband signal obtained by receiving the modulated radio-frequency wave, and demodulating a waveform-equalized signal,which is obtained by waveform-equalizing of the received signal of the baseband digital-modulated IQ signal by the use of transmission parameters of the radio transmission line derived from a despread spectrum signal obtained by despreading the spread spectrum IQ code sequence, to obtain a received data signal of the digital information transmitted from the transmitting side.

At the receiving side: an impulse response of the radio transmission line is derived from an average signal of the despread spectrum signal;

a pilot-synchronous detection signal is calculated which is obtained by multiplying each modulated IQ signal vector in the received signal of the baseband digital modulation signal by a complex conjugate of the impulse response for a first incoming wave;

inter-symbol interference is calculated by summing up the products of the respective signal vectors corresponding to received data signal of the baseband digital-modulated IQ signal and the impulse response; and the inter-symbol interference is subtracted from the pilot-synchronous detection signal, by which the waveform equalization can be performed.

There is further proposed a radio transmission apparatus for digital information according to the present invention, comprising a transmitter and a receiver;

the transmitter comprising:
preamble generating means for outputting spread spectrum IQ code words, as a preamble signal, whose auto-correlation side lobe is equal to zero during a preamble period;
information signal modulating means for outputting a modulated IQ signal representative of transmission data;
frame synthesizing means for synthesizing the preamble signal to the modulated IQ signal to obtain a baseband digital-modulated IQ signal;
up-converting means for up-converting the baseband digital-modulated IQ signal to provide an up-converted communication wave; and
a transmitting antenna for transmitting said up-converted communication wave; and the receiver comprising:
a receiving antenna for receiving the communication wave transmitted;
down-converting means for down-converting the communication wave signal received by the receiving antenna for conversion to a baseband digital-modulated IQ signal;
analog-to-digital converting means for converting the baseband digital-modulated IQ signal to a digital signal;
matched filter means for deriving a despread spectrum signal from the digital baseband digital-modulated IQ signal provided from the analog-to-digital converting means;
transmission parameter estimation means for deriving transmission parameter information necessary for waveform-equalization from the despread spectrum signal provided from the matched filter means;
waveform-equalizing means for equalizing the waveform of the digital-modulated IQ signal on the basis of the transmission parameter information; and
demodulating means for demodulating a waveform-equalizing signal provided from the waveform-equalizing means.

BRIEF DESCRIPTION OF THE DRAWINGS

The present invention will be described in detail below with reference to accompanying drawings, in which.

DETAILED DESCRIPTION

Embodiment

Figure 1:
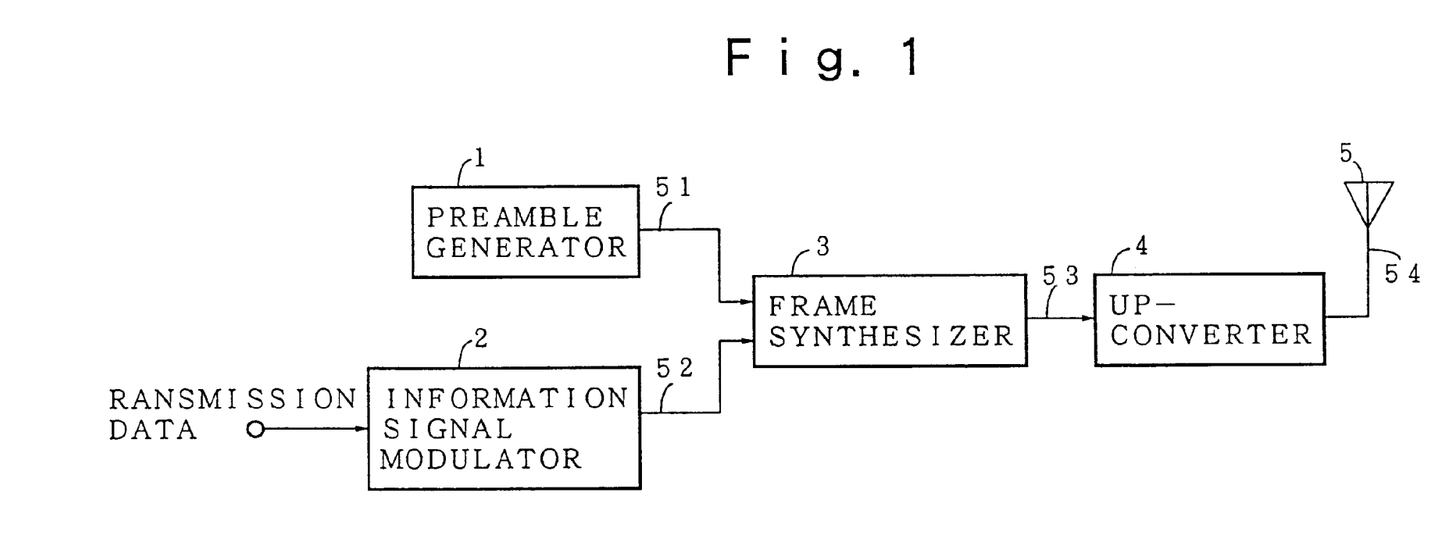
FIG. 1 is a block diagram illustrating the configuration of a transmitter in an embodiment of the present invention.

With reference to FIG. 1 showing a block diagram of a transmitter for a radio communication wave containing a spread spectrum wave in an embodiment of the present invention, a preamble generator 1 is operable during a preamble period of a transmission packet, and repeatedly outputs, as a preamble signal 51, a spread spectrum IQ code words whose auto-correlation side lobe is equal to zero. In FIG.1, the preamble signal 51 has an inphase(=I)-component and a quadrature (=Q)-component although shown by a single line. In this case,the I-component is more particularly a real part of a complex spread spectrum code, whose auto-correlation side lobe is equal to zero, while the Q-component is an imaginary part of this comprex spread spectrum code.

During the data period of the transmission packet, an information signal modulator 2 is operable and outputs a baseband digital-modulated IQ signal 52 in correspondence to transmission data.

The baseband digital-modulated IQ signal 52 has an inphase (=I)-component and a quadrature (=Q)-component although shown by a single line. In other words, a modulation operation is performed in the information signal modulator 2 to make correspondence between the states of the transmission data and the signal positions of its information domain of the baseband digital-modulated IQ signal 52, so that the I-component and the Q-component of the IQ signal 52 are successively obtained in correspondence to successive states of the transmission data. In case of employing a BPSK(Binary Phase Shift Keying), the I-component is a binary signal corresponding to the transmission data, while the Q-component is zero. In case of adopting QSPK (Qudrature Phase Shift Keying), the I-component is a binary signal obtained in correspondence to odd number-th data of the transmission data, while the Q-component is a binary signal obtained in correspondence to even number-th data of the transmission data.

Another modulation system ,such as QAM(Quadrature Amplitude Modulation) can be employed in place of the above phase modulation system.

A frame synthesizer 3 frame-synthesizes the preamble signal 51 to the modulation signal 52 and outputs a baseband digital-modulated IQ signal 53. The baseband digital-modulated IQ signal 53 is converted by an up-converter 4 to a radio-frequency wave 54, which is transmitted via a transmitting antenna 5.

Figure 2:
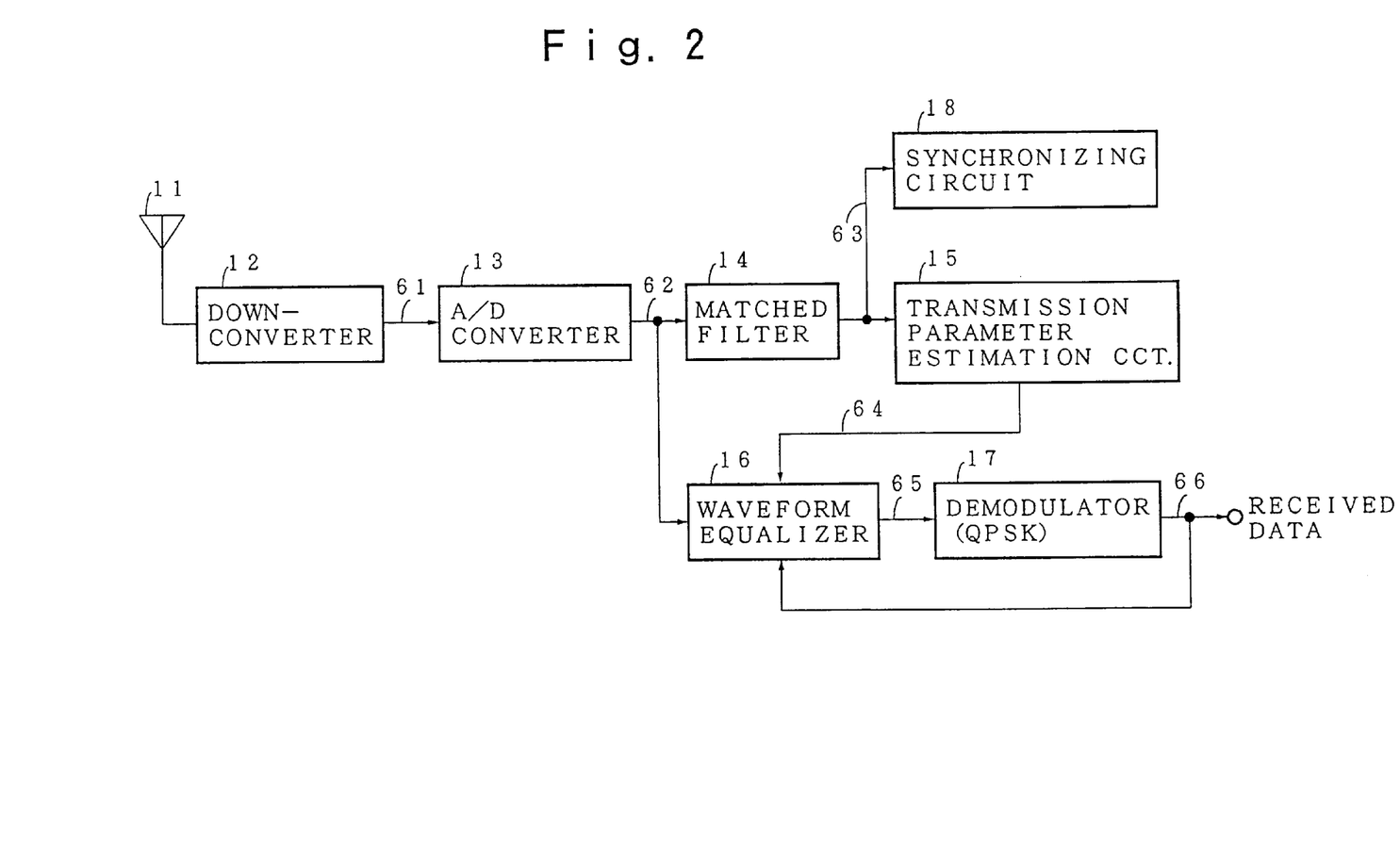
FIG. 2 is a block diagram illustrating the configuration of a receiver in an embodiment of the present invention.

With reference to FIG. 2 showing a block diagram of a receiver for spread spectrum communication in an embodiment of the present invention, the received signal of a receiving antenna is down-converted by a down-converter 12 at about the same frequency as the transmission frequency to a baseband digital-modulated IQ signal (hereinafter refered to "baseband IQ signal) 61. The baseband IQ signal 61 is converted by an analog-to-digital converter 13 to a digital IQ signal 62. The digital IQ signal 62 is branched to a matched filter 14 on one hand and a waveform equalizer (a decision feedback system) 16 on the other hand.

The matched filter 14 is operable during the preamble period, and provides the correlation between the received signal and the spread spectrum IQ code(hereinafter refered to "spread spectrum IQ code") transmitted during the preamble period. Since use is made of the spread spectrum code whose auto-correlation side lobe becomes zero, the matched filter 14 repeatedly outputs a signal produced by sampling the impulse response of the transmission line with a one-chip period. A despread spectrum signal 63 provided from the matched filter 14 is branched to a transmission parameter estimation circuit 15 on one hand and a synchronizing circuit 18 on the other hand.

The synchronizing circuit 18 is operable during the preamble period, and outputs a chip clock, a symbol clock and an analog-to-digital converting clock all synchronized with the received signal. The analog-to-digital converting clock is a clock of a frequency twice the chip rate synchronized with the received signal.

Since the despread spectrum signal 63 is a periodic signal the period of which is one symbol of the spread spectrum code, the transmission parameter estimation circuit 15 first performs averaging of the despread spectrum signal 63. The transmission parameter estimation circuit 15 further generates and outputs a waveform equalizing information signal necessary for waveform equalization through use of the matched filter output averaged signal.

Supplied with the digital IQ signal 62 and the waveform equalizing information signal 64, the waveform equalizer 16 performs waveform-equalization and outputs a waveform-equalizing signal 65. A QPSK (Quadrature Phase-Shift Keying) demodulator 17 demodulates the waveform-equalizing signal 65 and outputs a received data signal 66. In case of employing the decision feedback type waveform equalization scheme, the received data signal 66 is fed back to the waveform equalizer 16.

Figure 3:
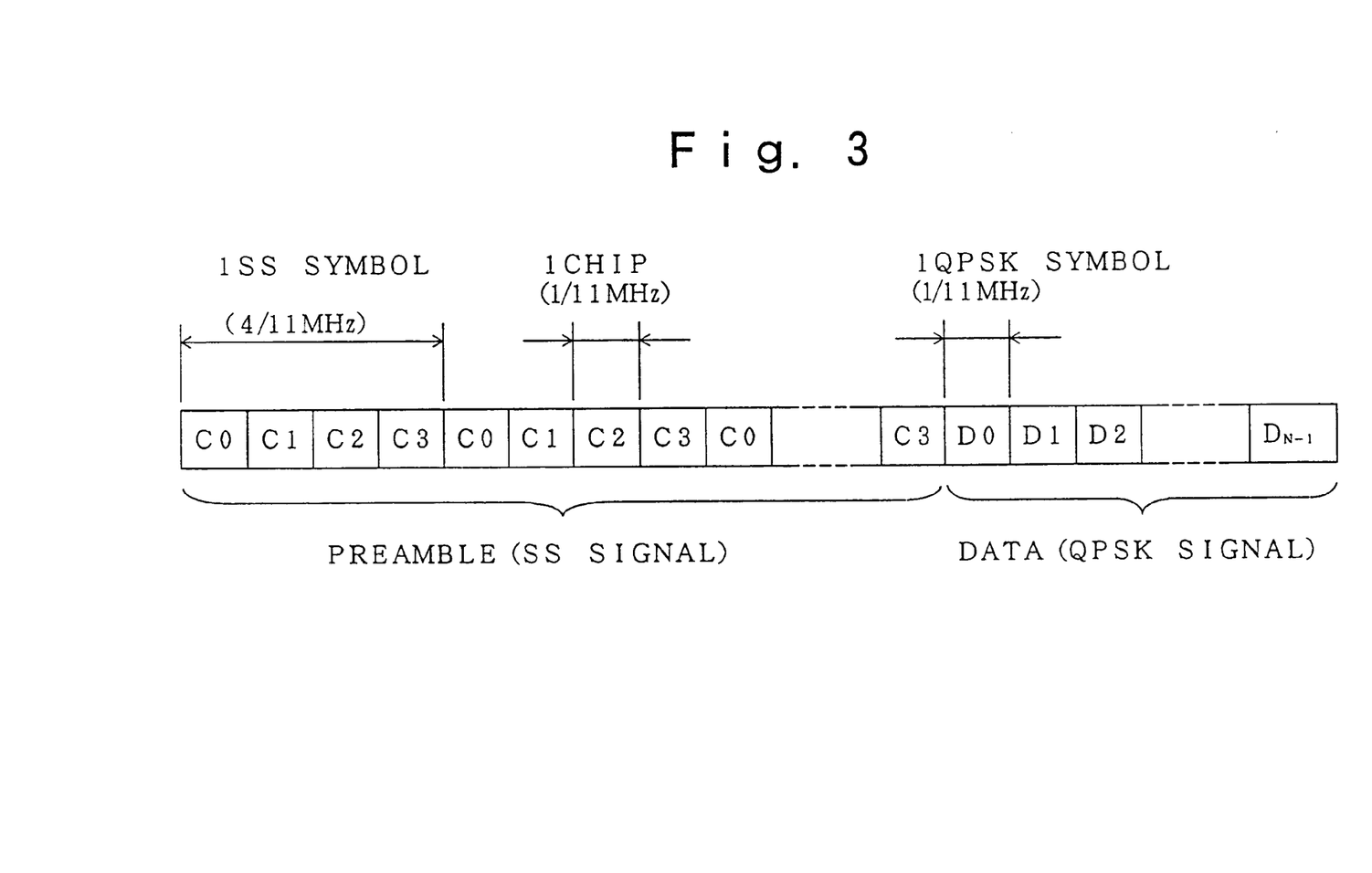
FIG. 3 is a diagram depicting the frame configuration of a transmission packet of a spread spectrum communication wave for use in the present invention.

FIG. 3 illustrates the frame configuration of the transmission packet of the spread spectrum communication according to an embodiment of the present invention. In FIG. 3 there are not shown a PLCP (Physical Layer Convergence Procedure) header, a UW (Unique Word), a CRC (Cyclic Redundancy Check), etc.

In the example of FIG. 3, complex spread spectrum code words of a code length 4 are repeatedly sent during the preamble period. If the chip rate is set at 11 Mcps, then the symbol rate during the preamble period is 2.75 Msps. As a complex spread spectrum code words whose auto-correlation side lobe is equal to zero, there is such, for example, as follows:

$$C = \left(e^{\frac{x}{4}j}, e^{\frac{3\pi}{4}j}, e^{\frac{\pi}{4}j}, e^{\frac{\pi}{4}j}\right).$$

Figure 4:
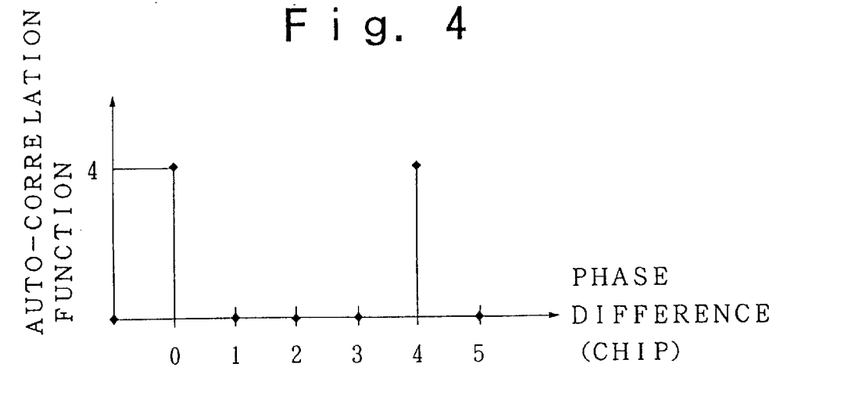
FIG. 4 is a diagram showing the auto-correlation function of a complex for use in the present invention.

In FIG. 4 there is depicted the auto-correlation function of a complex spread spectrum code C of a code length 4. The auto-correlation side lobe of the complex spread spectrum code C is zero, and each chip of the complex spread spectrum code is common to a OPSK signal in the signal point arrangement.

On the other hand, during the data period the example of FIG. 3 transmits the QPSK signal intact in its original signal pattern without spreading its spectrum. The symbol rate of the QPSK signal is 11 Msps.

The transmission packet depicted in FIG. 3 uses both of the spread spectrum signal and an ordinary QPSK signal, but their signal waveforms or constellations are all 11 Msps.

A detailed description will be given below of the circuit configuration and operation of the receiver in case of using a decision feedback type equalizer as the waveform equalizer 16.

Figure 5:
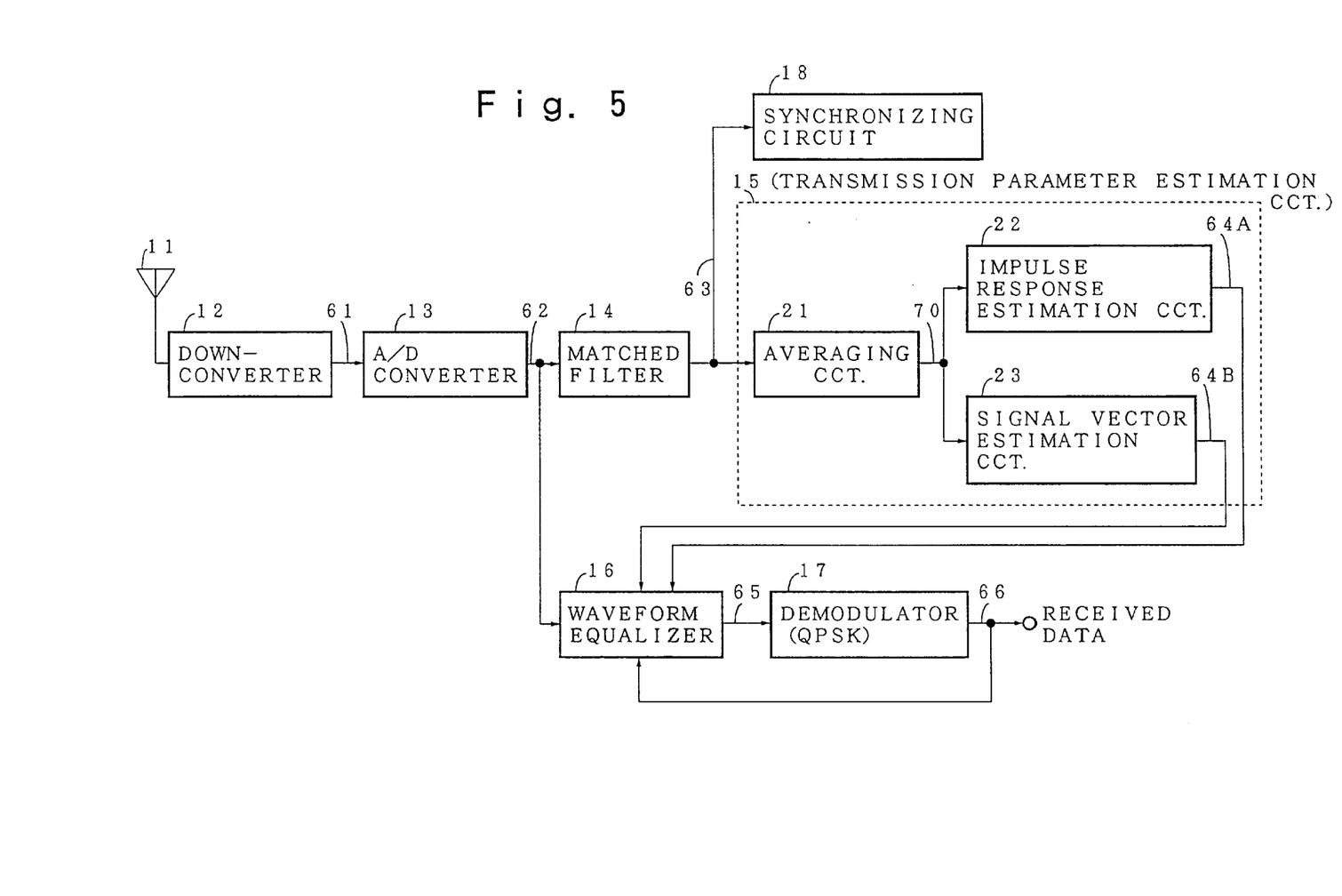
FIG. 5 is a block diagram depicting an example of the receiver configuration of this invention apparatus in the case of using a decision feedback type waveform equalizer.

FIG. 5 depicts the entire configuration of a receiver using the decision feedback type equalizer. In FIG. 5 the received signal from the receiving antenna 11 is down-converted by the down-converter 12 at about the same frequency as the transmission frequency to provide the baseband IQ signal 61. The baseband IQ signal 61 is A–D converted by the analog-to-digital converter 13 to the digital IQ signal 62. The digital IQ signal 62 s branched to the matched filter 14 on one hand and the waveform equalizer 16 on the other hand.

The matched filter 14 is operable during the preamble period, and provides the correlation between the received signal and the spread spectrum code sent during the preamble period. Since the spread spectrum code whose auto-correlation side lobe becomes zero is employed, the matched filter 14 repeatedly outputs at 4-chip intervals a signal obtained by sampling the impulse response of the transmission line at one-chip intervals. The despread spectrum signal 63 from the matched filter 14 is branched to an averaging circuit 21 on one hand and the synchronizing circuit 18 on the other hand.

Figure 10:
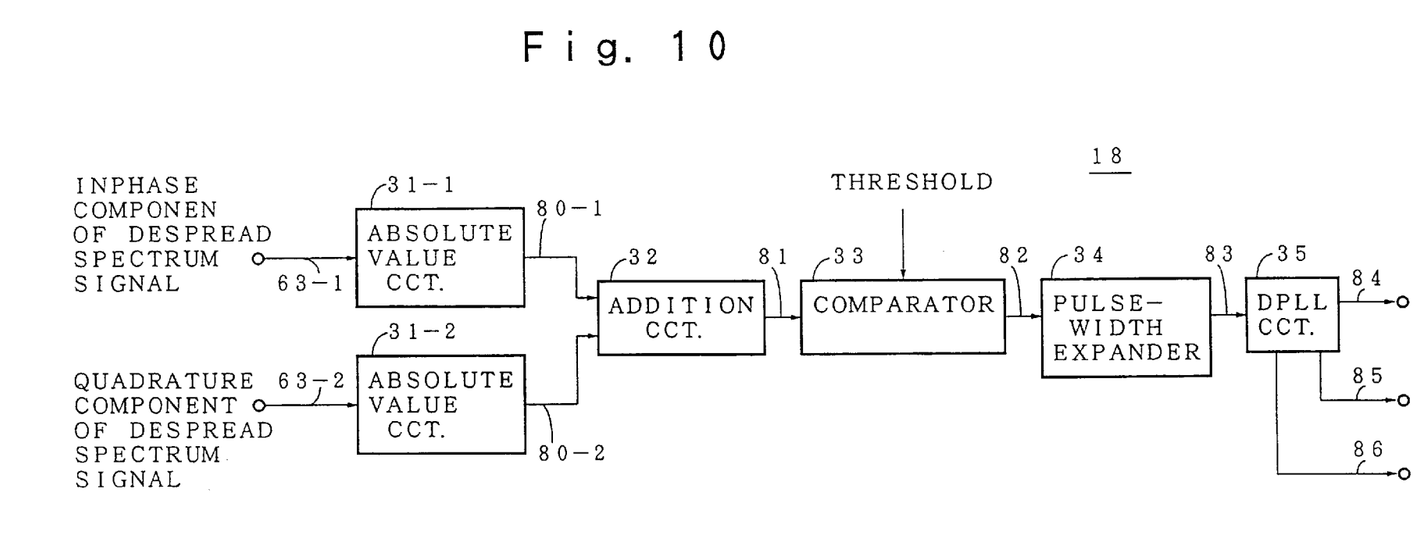
FIG. 10 is a block diagram illustrating a concrete example of a synchronizing circuit for use in the present invention.

The synchronizing circuit 18 is operable during the preamble period, and a chip clock 84, a symbol clock 85 and an analog-to-digital converting clock 86 all synchronized with the received signal. The analog-to-digital converting clock is a clock of a frequency twice the chip rate synchronized with the received signal. FIG. 10 illustrates a block configuration of the synchronizing circuit 18 in an embodiment of the present invention.

In FIG. 10, absolute values 80-1 and 80-2 of In-phase and Quadrature components of the despread spectrum signal are obtained by absolute value circuits 30-1 and 31-2, respectively, and the sum of the absolute values is obtained by an addition circuit 32. A comparator 33 compares the envelope of despread spectrum signal from the addition circuit 32 with a threshold value and outputs a correlation peak signal 82 which goes "L" of "H" depending on whether the signal 81 is smaller or larger than the threshold value.

The correlation peak signal 82 is a periodic signal whose period is one symbol of the spread spectrum code, and when the received signal has an excellent SN ratio, this signal goes "H" at least once in one symbol period. The synchronizing circuit 18 depicted in FIG. 10 operates in a manner to be synchronized with that first incoming one of multi-path waves whose magnitude exceeds the threshold value. That is, there may be cases where the correlation peak signal 82 goes "H" twice or more during one symbol period according to the circumstances of the multi path, but the synchronizing circuit 18 of FIG. 10 operates in synchronization with the timing at which the correlation peak signal 82 goes "H" for the first time during one symbol period. To perform this, the pulse width of the correlation peak signal 82 is expanded by a pulse-width expander 34 so that it is larger than a delay distribution of the multi path, and a DPLL (Digital Phase Lock Loop) circuit 35 is activated by the leading edge of a pulse-width expanded signal 83 thus obtained.

Figure 11:
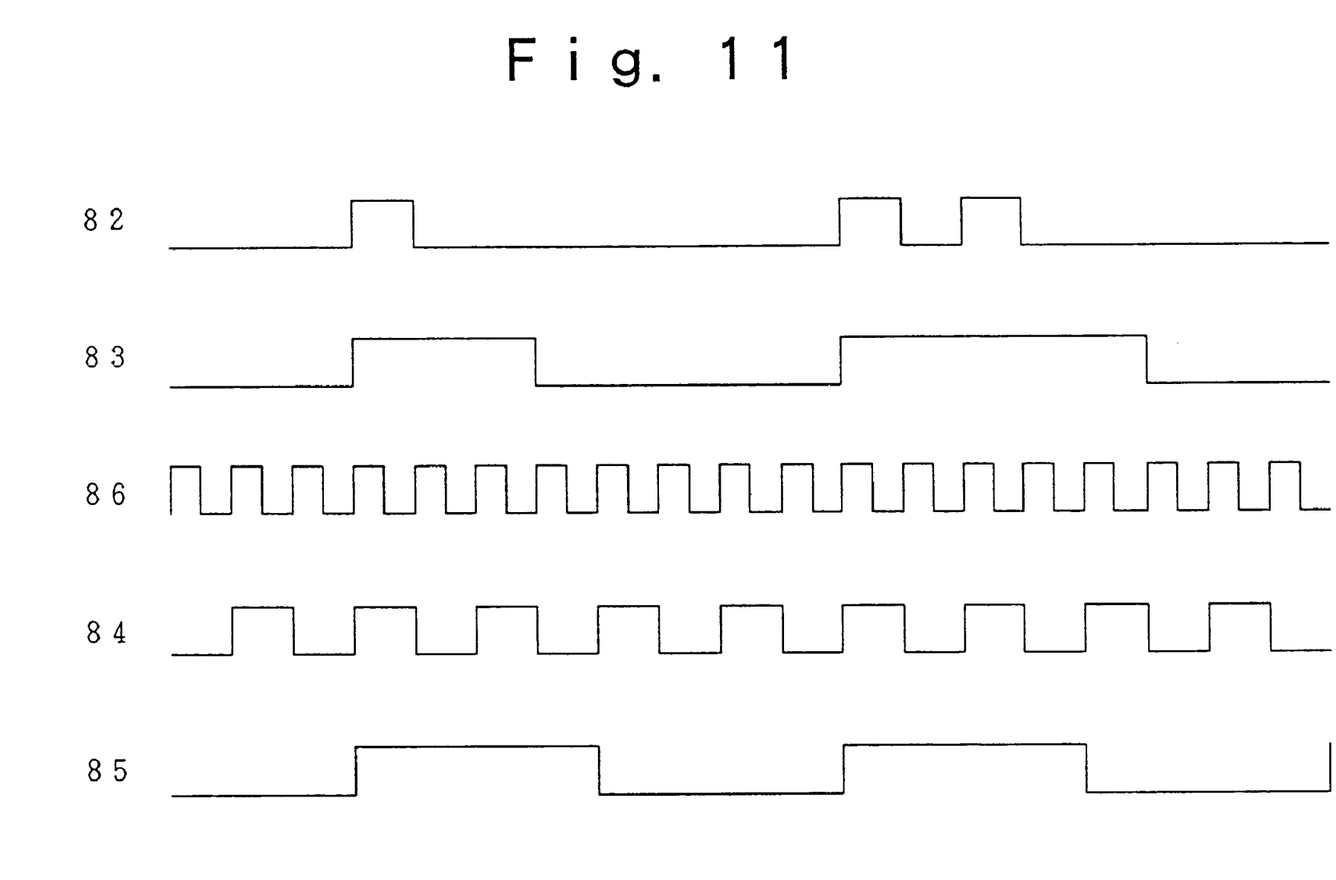
FIG. 11 is a diagram depicting the operation timing of the synchronizing circuit shown in FIG. 10.

FIG. 11 shows an example of the operation timing of the synchronizing circuit 18 depicted in FIG. 10. Incidentally, the pulse-width expander 34 can be implemented, for example, by a circuit configuration which inputs the correlation peak signal into a shift register and outputs as the pulse-width expanded signal 83 a signal which is the OR logic of respective tap outputs.

The threshold value may be fixed, but it may also be obtained by precalculating the maximum amplitude of the multi-path wave and multiplying it by a fixed constant, for example, 1/4.

The analog-to-digital converter 13 and the matched filter 14 are operable on a clock of a frequency twice the chip rate which is output from the synchronizing circuit 18. The decision feedback type equalizer 16 is operable on a clock of the chip rate which is output from the synchronizing circuit 18.

The despread spectrum signal 63 from the matched filter 14 is applied to the averaging circuit 21, which calculates the average value of the despread spectrum signal 63 at respective timing of the lead wave and one-, two- and three-chip delayed waves and provides the average value as an output average signal of matched filter 70.

The respective timing of the lead wave and the one-, two- and three-chip delayed waves is provided from the synchronizing circuit 18.

The output average signal of matched filter 70 is branched into two, one of which is applied to an impulse response estimation circuit 22 and the other of which is applied to a signal vector estimation circuit 23. The operations of the impulse response estimation circuit 22 and the signal vector estimation circuit 23 will be described below using mathematical expressions.

The transmission signal during the preamble period is a periodic function of a four-chip period and hence will hereinafter be identified by a length-4 vector. The transmission signal vector $T_0$ is given by the following equation (1).

$$T_0 = (t_0, t_1, t_2, t_3) \quad (1)$$

For brevity, assume that a multi-path delay time is within three chips. The multi-path impulse response, sampled at one-chip intervals, will hereinafter be identified by a length-4 vector. The impulse response vector h is given by the following equation (2).

$$h = (h_0, h_1, h_2, h_3) \quad (2)$$

Let it the received signal vector at this time be represented by $R_0$ given by the following equation (3):

$$R_0 = (r_0, r_1, r_2, r_3) \quad (3)$$

Furthermore, let $T_1$ to $T_3$ and $R_1$ to $R_3$ represent vectors obtained by circulating respective components of the vectors $T_0$ and $R_0$ as expressed by the following equation (4).

$$T_1 = (t_3, t_0, t_1, t_2) \quad R_1 = (r_3, r_0, r_1, r_2) \quad (4)$$
$$T_2 = (t_2, t_3, t_0, t_1) \quad R_2 = (r_2, r_3, r_0, r_1)$$
$$T_3 = (t_1, t_2, t_3, t_0) \quad R_3 = (r_1, r_2, r_3, r_0)$$

At this time, the received vectors $R_0$ to $R_3$ are expressed by the following equations (5) using transmission vectors $T_0$ to $T_3$.

$$R_0 = h_0(t_0, t_1, t_2, t_3) + h_1(t_3, t_0, t_1, t_2) + \quad (5)$$
$$h_2(t_2, t_3, t_0, t_1) + h_3(t_1, t_2, t_3, t_0)$$
$$= h_0 T_0 + h_1 T_1 + h_2 T_2 + h_3 T_3$$
$$R_1 = h_0 T_1 + h_1 T_2 + h_2 T_3 + h_3 T_0$$
$$R_2 = h_0 T_2 + h_1 T_3 + h_2 T_0 + h_3 T_1$$
$$R_3 = h_0 T_3 + h_1 T_0 + h_2 T_1 + h_3 T_2$$

In the matched filter, the correlations of the received signal vectors $R_0$, $R_3$, $R_2$, $R_1$ with a reference code T' are computed in a sequential order. The signal component $S_{mf}$ of the despread spectrum signal 63 is given by the following equation (6).

$$S_{mf} = (R_0 \cdot T', R_3 \cdot T', R_2 \cdot T', R_1 \cdot T') \quad (6)$$

In Eq. (6), R·T' represents the inner product of the vectors R and T'. That is, $$R_0 \cdot T' = \sum_{i=0}^{3} r_i t_i'^*$$

where t* represents a complex conjugate of a complex number t.

The vector $T_0$ may be used as the reference code T', but since the use of a $-\pi/4$ turned version of $T_0$ permits simplification of the configuration of the transmission parameter estimation circuit 15, T' is set as follows:

$$T' = e^{-j\frac{\pi}{4}} T_0 = \left(t_0 e^{-j\frac{\pi}{4}}, t_1 e^{-j\frac{\pi}{4}}, t_2 e^{-j\frac{\pi}{4}}, t_3 e^{-j\frac{\pi}{4}}\right) \quad (7)$$

Since the spread spectrum code whose auto-correlation side lobe becomes zero is used as the transmission signal vector, the following equation (8) holds:

$$T_i \cdot T' = \begin{cases} 4e^{j\frac{\pi}{4}} & (i = 0) \\ 0 & (i \neq 0) \end{cases} \quad (8)$$

Substitution of Eqs. (5) and (8) into Eq. (6) gives the following equation (9):

$$S_{mf} = \left(4h_0 e^{-j\frac{\pi}{4}}, 4h_1 e^{-j\frac{\pi}{4}}, 4h_2 e^{-j\frac{\pi}{4}}, 4h_3 e^{-j\frac{\pi}{4}}\right) \quad (9)$$

Assuming that the influence of thermal noise and the like has been sufficiently suppressed by sufficient averaging process in the averaging circuit 21, the output average signal of matched filter 70 is expressed by Eq. (9).

The output average signal of matched filter 70 from the averaging circuit 21 is applied to the impulse response estimation circuit 22, from which is output an impulse response signal 64A which is a multi-path impulse response sampled at one-chip intervals.

To derive the multi-path impulse response from the output average signal of matched filter 70 expressed by Eq. (9), the phase of the complex number of each component in Eq. (9) needs only to be rotated by a value of ($-\pi/4$).

By the way, a vector obtained by rotating the phase of a complex vector (p, q) by $-\pi/4$ is given by:

$$\left(\frac{p}{\sqrt{2}} + \frac{q}{\sqrt{2}}, \frac{q}{\sqrt{2}} - \frac{p}{\sqrt{2}}\right)$$

Then, each component of Eq. (9) is subjected to the following transformation:

$$(p, q) \rightarrow (p+q, q-p) \tag{10}$$

The transformation expressed by Eq. (10) corresponds to the operation of multiplying each component by a complex number of $$\sqrt{2} \cdot e^{-j\frac{\pi}{4}}.$$

A vector, which is obtained by subjecting each component of the output average signal of matched filter 70 expressed by Eq. (9) to the operation of Eq. (10), is the impulse response signal 64A. Letting this vector be represented by IR, the vector IR is given by the following equation (11):

$$IR = (4\sqrt{2}h_0, 4\sqrt{2}h_1, 4\sqrt{2}h_2, 4\sqrt{2}h_3) \tag{11}$$

From Eq. (11), it is apparent that the signal obtainable by subjecting the output average signal of matched filter ($S_{mf}$) 70 to the transformation of Eq. (10) is a ($4\sqrt{2}$)-multiplied version of the transmission-line impulse response in the digital IQ signal 62.

Information necessary for waveform equalization is the form of the impulse response, and information on the absolute value of the impulse response is unnecessary; hence, the impulse response signal given by Eq. (11) is used to perform the waveform equalization.

The output average signal of matched filter 70 from the averaging circuit 21 is applied to the signal vector estimation circuit 23, which multiplies each QPSK-modulated signal vector by a complex conjugate of the impulse response to the first incoming wave to obtain a transmission signal vector and outputs it as signal vector signal 64B. A signal vector S (1, 1) corresponding to QPSK data (1, 1) is expressed by the following equation (12):

$$S(1, 1) = h_0^* e^{j\frac{\pi}{4}} \tag{12}$$

Incidentally, since a real-imaginary-part exchanged version of a complex number $R \cdot e^{j\theta}$ is $$R \cdot e^{j\left(\frac{\pi}{2} - \theta\right)},$$

a real-imaginary-part exchanged version of a complex number $$(R \cdot e^{j\theta}) \cdot e^{j\frac{\pi}{4}}$$

is given by the following equation (13):

$$R \cdot e^{j\left\{\frac{\pi}{2}\left(\theta + \frac{\pi}{4}\right)\right\}} R \cdot e^{j(-\theta)} \cdot e^{-j\frac{\pi}{4}} = (R \cdot e^{j\theta})^* \cdot e^{j\frac{\pi}{4}} \tag{13}$$

This indicates that a real-imaginary-part exchanged version of $$h_0 e^{j\frac{\pi}{4}}$$

becomes $$h_0^* e^{j\frac{\pi}{4}}.$$

Accordingly, it will be seen that the signal vector S (1, 1) can be obtained by exchanging the real and imaginary parts of the component, $$4h_0 e^{j\frac{\pi}{4}},$$

of the output average signal of matched filter 70 corresponding to the first incoming wave given by Eq. (9) and dividing the exchanged version by 4.

By turning the signal vector S (1, 1) by 90, 180 and 270 degrees, signal vectors S (−1, 1), S (−1, −1) are obtained. These turning operations can be implemented by an exchange of I and Q components and an inversion of signs.

The digital IQ signal 62, the impulse response signal 64A, the signal vector signal 64B and the received data signal 66 from the QPSK demodulator 17 are applied to the decision feedback type waveform equalizer 16, which operates during the data period and performs decision feedback type waveform equalization of the received signal.

The operation for the decision feedback waveform equalization will be described below using mathematical equations.

Let an i-th transmission symbol during the data period by represented by $TS_i$ and an I-th received symbol by $RS_i$. AT this time, the following equation (14) holds:

$$RS_i = h_0 TS_i + h_1 TS_{i-1} + h_2 TS_{i-2} + h_3 TS_{i-3} \tag{14}$$

Multiplication of the both sides of Eq. (14) by $h_0^*$ gives the following equation (15):

$$h_0^* RS_i = |h_0|^2 TS_i + h_1 h_0^* TS_{i-1} + h_2 h_0^* TS_{i-2} + h_3 h_{h0}^* TS_{i-3} \tag{15}$$

On the other hand, the operation of the decision feedback type waveform equalizer 16 is expressed by the following equation (16):

$$EQ_i = h_0^* TS_i - h_1(h_0^* TS'_{i-1}) - h_2(h_0^* TS'_{i-2}) - h_3(h_0^* TS'_{i-3}) \tag{16}$$

where $EQ_i$ is a waveform equalizing signal 65 for the i-th received symbol and $TS'_{i-k}$ is a k-symbol-preceding QPSK signal estimated from k-symbol-preceding decision data.

In Eq. (16), $RS_i$ is given by the digital IQ signal 62, $h_0^*$, $h_1$, $h_2$ and $h_3$ are given by the impulse response signal 64A, and $h_0^* TS'_{i-k}$ is given by he signal vector signal 64B and the received data signal 66.

Since $TS'_{i-k} = TS_{i-k}$ holds when the QPSK demodulation has been correctly performed in the last three symbol periods, substitution of Eq. (15) into Eq. (16) gives the following equation (17):

$$EQ_i = |h_0|^2 TS_i \tag{17}$$

The QPSK demodulator 17 performs QPSK modulation of the waveform-equalizing signal ($EQ_i$) 65, and outputs the received data signal 66.

Figure 6:
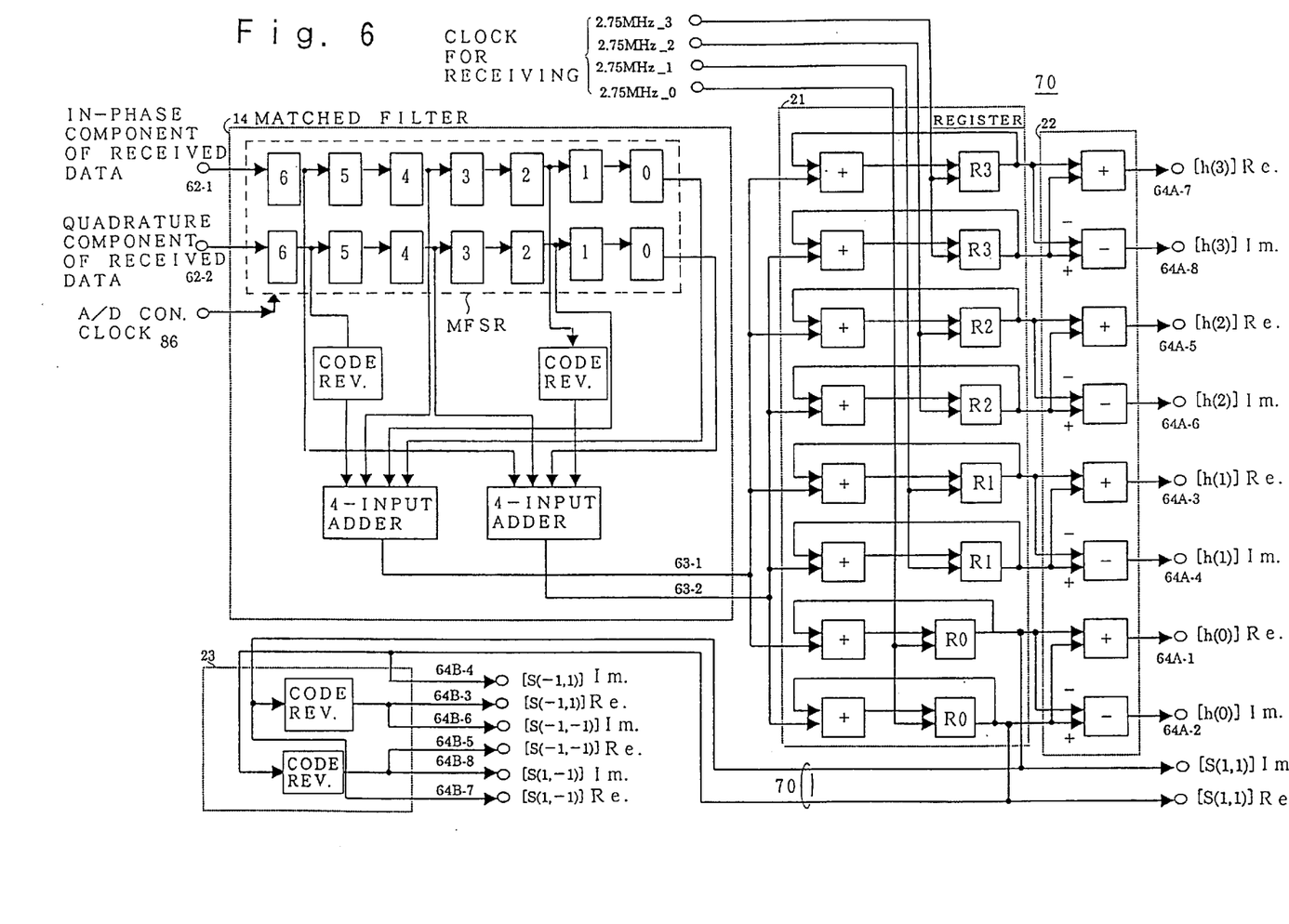
FIG. 6 is a block diagram concretely depicting a matched filter and its peripheral circuits for use in the present invention.
Figure 12:
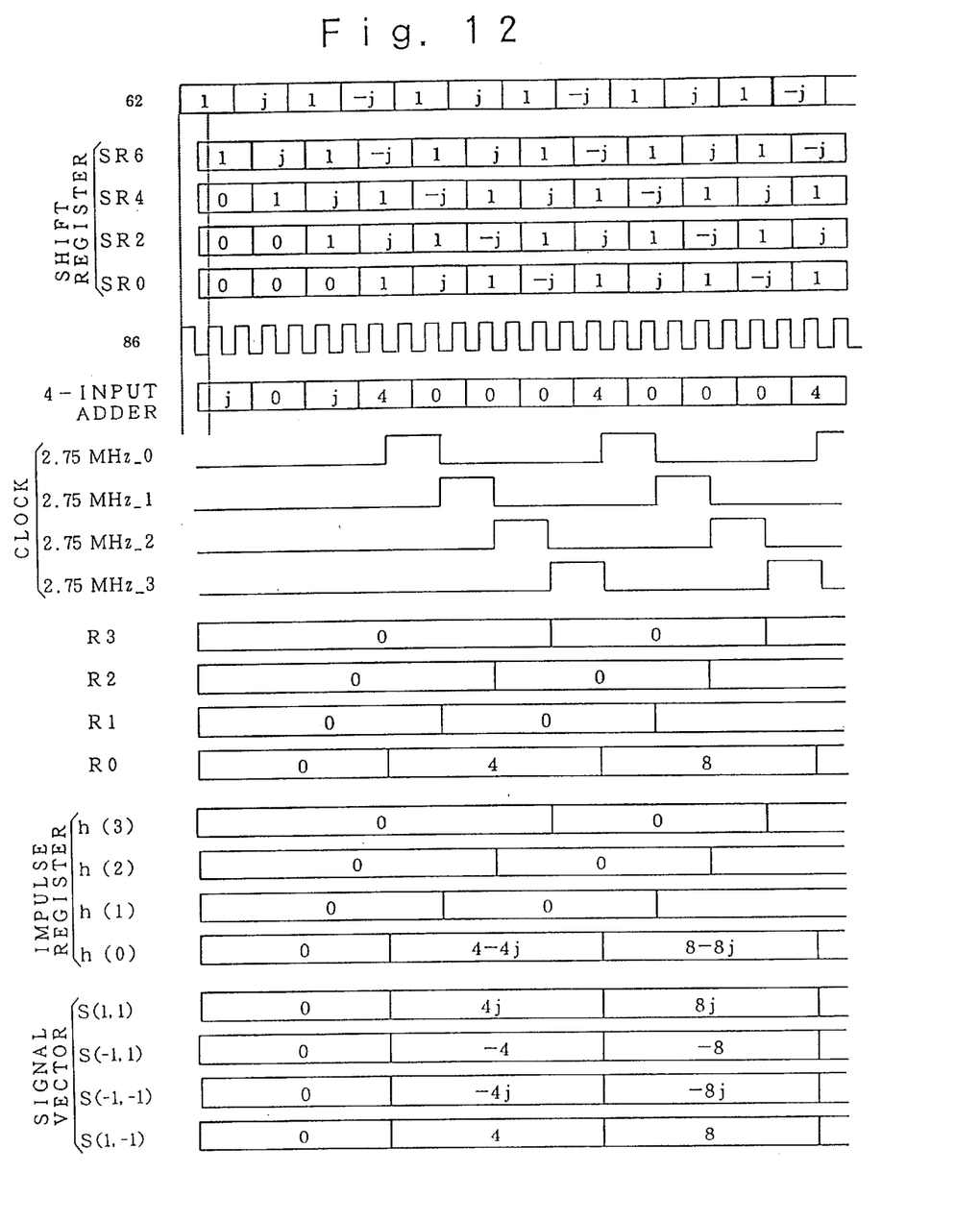
FIG. 12 is a diagram depicting the operation timing of the matched filter and its peripheral circuits in the present invention.

FIG. 6 shows, by way of example, circuit configurations of the matched filter and its peripheral circuits. FIG. 12 shows the operation timing of the matched filter and the peripheral circuits. The matched filter 14 depicted in FIG. 6 has a configuration which includes provisions for the use of a complex spread spectrum code $$C = \left(e^{\frac{\pi}{4}j}, e^{\frac{3\pi}{4}j}, e^{\frac{\pi}{4}j}, e^{\frac{\pi}{4}j}\right)$$

in the transmitter. In this case, the reference code T' of Eq. (7) is expressed by the following equation (18):

$$T'=(1, j, 1-j) \quad (18)$$

Hence, the matched filter 14 in FIG. 6 calculates the inner product of the digital IQ signal 62 for the last four symbols and the reference code T'. Since the despread spectrum signal 63 composed of In-phase and Quadrature components of despread spectrum signal 63-1 and 63-2, which is provided from the matched filter 14, is a periodic signal whose period is one symbol of the spread spectrum code, the averaging circuit 21 computes average values of the despread spectrum signal 63 at the timing of the first incoming wave and one-, two- and three-chip delayed waves. To calculate the average values of the despread spectrum signal 63 at the four different timing, the averaging circuit 21 is supplied with four symbol clocks displaced one chip apart in phase. These symbol clocks are generated in a timing generator (not shown in FIGS. 2 and 5) of the receiver.

In the impulse response estimation circuit 22, each component of the output average signal of matched filter 70 from the averaging circuit 21 is subjected to the transformation expressed by Eq. (10) to obtain the impulse response signal 64A.

Figure 7:
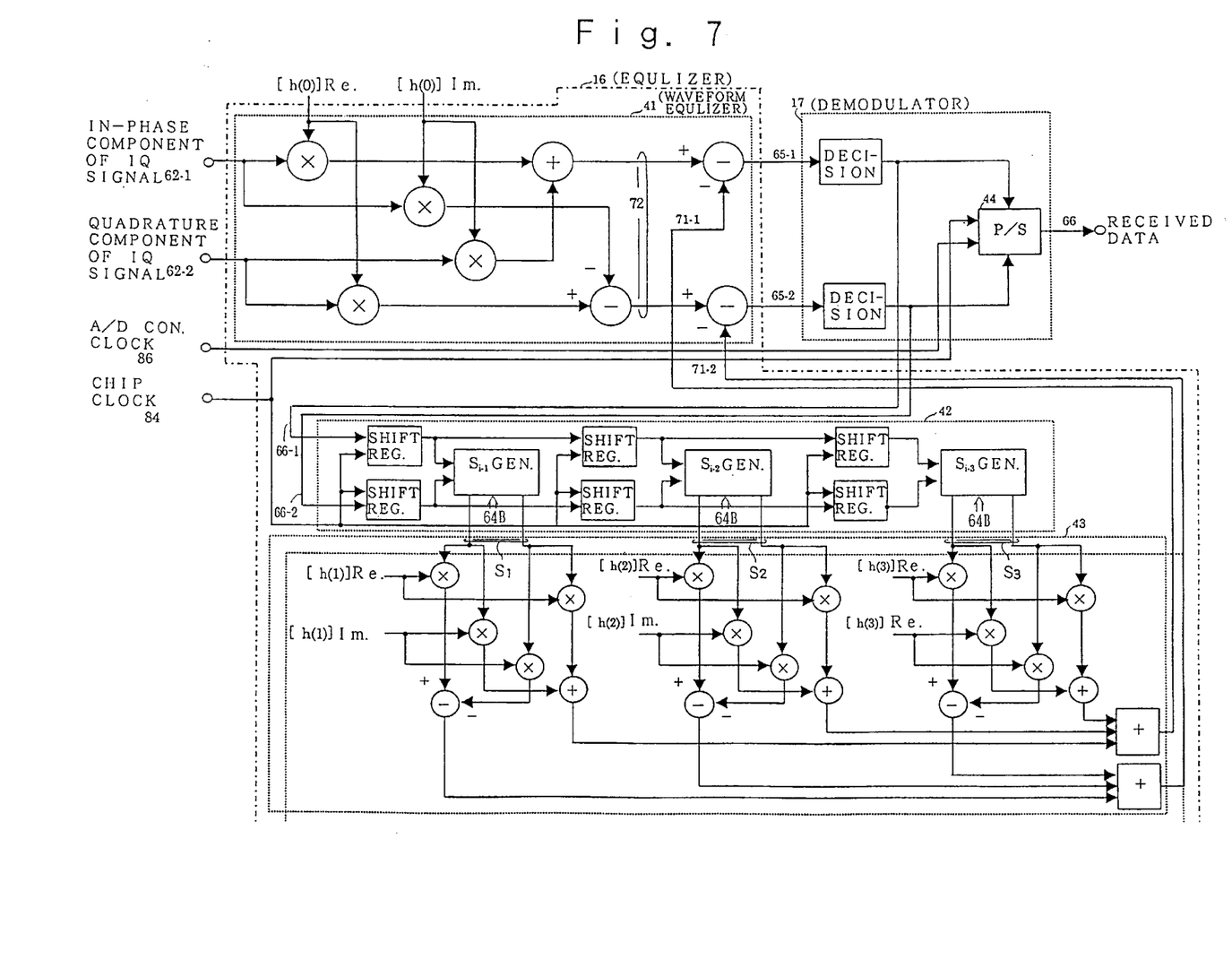
FIG. 7 is a block diagram concretely depicting a waveform equalizer and its peripheral circuits for use in the present invention.

The signal vector estimation circuit 23 derives, from the signal vector for the QPSK data (1, 1), the signal vector for another piece of QPSK data by the operations of exchanging the I and Q components and inverting the signs + and −. FIG. 7 depicts, by way of example, configurations of the waveform equalizer and its peripheral circuits. The decision feedback type waveform equalizer 16 in FIG. 7 is made up of a waveform equalizer 41, a signal vector synthesizer 42 and an inter-symbol interference generator 43. The waveform equalizer 41 performs pilot-synchronous detection by multiplying the digital IQ signal by a complex conjugate of a component h(0) of the impulse response signal 64A corresponding to the first incoming wave, and suppresses inter-symbol interference by subtracting an inter-symbol interference signal 71 (In-phase and Quadrature components of inter-symbol interference signal 71-1 and 71-2) from a pilot-synchronous detection signal 72. The signal with inter-symbol interference thus suppressed is output as the waveform-equalizing signal 65 (In-phase and Quadrature components of waveform equalizing signal 65-1 and 65-2) from the decision feedback type waveform equalizer 16.

The signal vector synthesizer 42 is made up of shift registers which time-shift In-phase and Quadrature components of received data 66-1 and 66-2 from the QPSK demodulator 17 at one-symbol intervals, and signal vector synthesizer circuits which receive past received data and output the corresponding signal vectors ($S_{i-1}$, $S_{i-2}$, $S_{i-3}$). Each signal vector synthesizer circuit is supplied with the signal vector signal 64B from the signal vector estimation circuit 23 and decision data, and selectively outputs the signal vector corresponding to the past decision data. In the inter-symbol interference generator 43 the signal vectors $S_1$, $S_2$, $S_3$ corresponding to the past decision data and impulse responses [h(1)]Re., [h(1)]Im., [h(2)]Re., [h(2)]Im., [h(3)] Re., [h(3)]Im. corresponding to delay times of the signal vectors are complex-multiplied, and their total sums are calculated and output as In-phase and Quadrature components 71-1 and 71-2 of the inter-symbol interference signal to the waveform equalizer 41.

Figure 8:
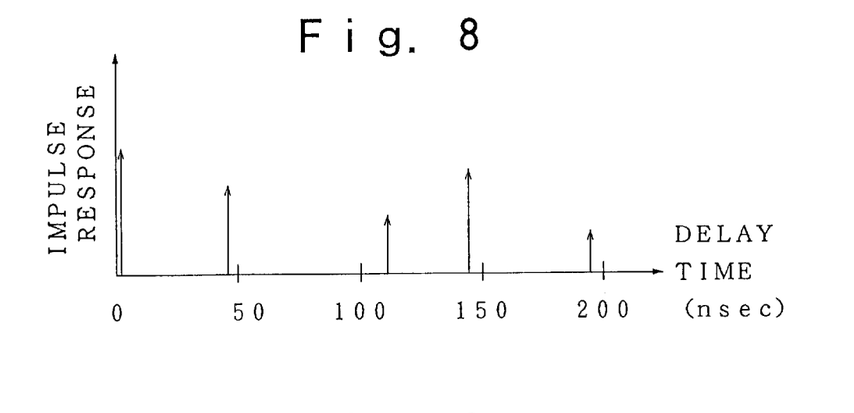
FIG. 8 is a characteristic diagram showing the impulse response of a transmission line model used in simulations of the present invention.
Figure 9:
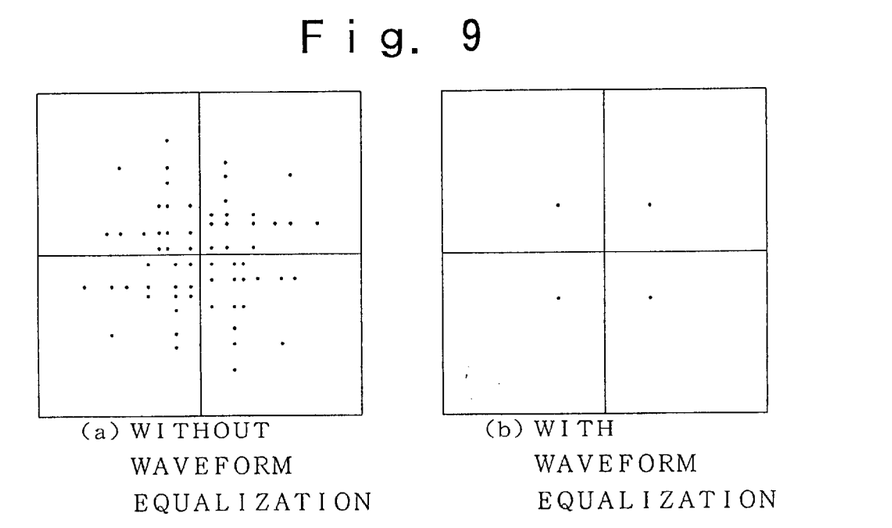
FIG. 9 is a diagram showing the constellation of a waveform equalizing signal in the simulations depicted in FIG. 8.

The actual transmitting and receiving operations of the transmitter depicted in FIG. 1 and the receiver in FIGS. 5, 6, 7 and 10 were investigated through computer simulations. FIG. 8 shows the impulse response of a transmission line model used in the computer simulations. FIG. 9 shows simulation results of the constellation of the waveform-equalizing signal.

For comparison, there are shown constellations in the case (a) where the waveform equalization was carried out and in the case (b) of no waveform equalization. The bit error rate with no waveform equalization was of 0.27, but the bit error rate was reduced down to zero by the waveform equalization.

As will be seen from Eq. (17) and the computer simulation results in FIG. 9, the transmitter and receiver of the radio transmission apparatus for digital information according to the present invention permit implementation of high-quality communication even under the multi-path environments. Further, since the QPSK transmission takes place during the data period, it is possible to obtain a transmission rate twice the chip rate, allowing realization of high-speed transmission at a rate above 20 Mbps in the 26 MHz frequency band.

As described above, with the use of the transmitter and receiver of the radio transmission apparatus for digital information according to the present invention, the receiver side calculates the impulse response of the radio transmission line during the preamble period and uses the information to perform waveform equalization, hence making it possible to accurately suppress inter-symbol interference by multi-path reflection. Besides, since the QPSK transmission is carried during the data period, a transmission rate twice the chip rate can be obtained, and as the result of this, high-speed transmission at a rate above 20 Mbps can be achieved using the 26 MHz frequency band.

What I claim is:

1. A radio transmission method for digital information comprising the steps of:

from a transmitting side, transmitting, over a radio transmission line, a modulated radio-frequency wave obtained by modulating a radio-frequency wave by a transmission baseband IQ signal, which is obtained by frame-synthesizing a baseband digital IQ signal modulated by the digital information to a spread spectrum IQ code sequence whose auto-correlation side lobe is equal to zero; and at the receiving side, separating a received signal of the spread spectrum IQ code sequence and a received signal of the baseband digital-modulated IQ signal from a received baseband signal obtained by receiving the modulated radio-frequency wave, and demodulating a waveform-equalized signal, which is obtained by waveform-equalization of the received signal of the baseband digital-modulated IQ signal by the use of transmission parameters of the radio transmission line derived from a despread spectrum signal obtained by despreading the spread spectrum IQ code sequence, to obtain a received data signal of the digital information transmitted from the transmitting side.

2. A radio transmission method for digital information as claimed in claim 1, characterized by:

at said receiving side, deriving an impulse response of the radio transmission line from an average signal of the despread spectrum signal;

calculating a pilot-synchronous detection signal obtained by multiplying each modulation signal vector in the received signal of the baseband digital-modulated IQ signal by a complex conjugate of the impulse response for a first incoming wave;

calculating inter-symbol interference by summing up the products of the respective signal vectors corresponding to received data signal of the baseband digital-modulation IQ signal and the impulse response; and subtracting the inter-symbol interference from the pilot-synchronous detection signal, thereby performing said waveform-equalization of the received signal.

3. A radio transmission apparatus for digital information, comprising:

a transmitter and a receiver;

said transmitter comprising:

preamble generating means for outputting spread spectrum IQ code words, as a preamble signal, whose auto-correlation side lobe is equal to zero during a preamble period;

information signal modulating means for outputting a modulated IQ signal representative of transmission data;

frame synthesizing means for synthesizing the preamble signal to the modulated IQ signal to obtain a baseband digital-modulated IQ signal;

up-converting means for up-converting the baseband digital modulated IQ signal to provide an up-converted communication wave; and a transmitting antenna for transmitting an up-converted communication wave;

said receiver comprising:

a receiving antenna for receiving said communication wave transmitted;

down-converting means for down-converting the communication wave received by the receiving antenna for conversion to a baseband digital-modulated IQ signal;

analog-to-digital converting means for converting the baseband digital-modulated IQ signal to a digital signal;

matched filter means for deriving a despread spectrum signal from the digital-modulated IQ signal provided by the analog-to-digital converting means;

transmission parameter estimation means for deriving transmission parameter information necessary for waveform-equalization from the despread spectrum signal provided from the matched filter means;

waveform-equalizing means for equalizing a waveform of the digital-modulated IQ signal on the basis of the transmission parameter information; and demodulating means for demodulating a waveform-equalizing signal provided from the waveform equalizing means.

* * * * *